US007004387B1

(12) United States Patent
Kaimikaua et al.

(10) Patent No.: US 7,004,387 B1
(45) Date of Patent: Feb. 28, 2006

(54) SYSTEM AND METHOD FOR PREVENTING THEFT AT AUTOMATIC TELLER MACHINES

(76) Inventors: Charles M. Kaimikaua, 2204 Plant Ave., Redondo Beach, CA (US) 90278; Regina A. Anderson-Lewis, 2204 Plant Ave., Redondo Beach, CA (US) 90278

( * ) Notice: Subject to any disclaimer, the term of this patent is extended or adjusted under 35 U.S.C. 154(b) by 0 days.

(21) Appl. No.: 10/965,397

(22) Filed: Oct. 15, 2004

(51) Int. Cl.
*G06K 5/00* (2006.01)

(52) U.S. Cl. ...................................... 235/380; 235/379

(58) Field of Classification Search ................ 235/380, 235/379, 382, 382.5, 375, 376; 902/1, 20; 705/42, 43, 71
See application file for complete search history.

(56) References Cited

U.S. PATENT DOCUMENTS

| | | | | |
|---|---|---|---|---|
| 4,013,843 A | | 3/1977 | Lupattelli et al. | 379/230 |
| D275,753 S | | 10/1984 | Mahan | D14/245 |
| 4,920,556 A | | 4/1990 | Wong | 379/51 |
| 5,315,581 A | | 5/1994 | Nakano et al. | 370/218 |
| 5,548,632 A | * | 8/1996 | Walsh et al. | 902/1 |
| 5,613,012 A | * | 3/1997 | Hoffman et al. | 235/380 |
| 5,805,719 A | * | 9/1998 | Pare et al. | 382/115 |
| 5,995,847 A | | 11/1999 | Gergen | 455/521 |
| 6,055,438 A | * | 4/2000 | Winner, Jr. | 235/379 |
| 6,262,666 B1 | * | 7/2001 | Lodichand | 340/573.1 |
| 6,853,750 B1 | * | 2/2005 | Aoki | 382/190 |
| 2001/0041007 A1 | * | 11/2001 | Aoki | 382/190 |
| 2002/0038818 A1 | * | 4/2002 | Zingher et al. | 235/381 |
| 2002/0169539 A1 | * | 11/2002 | Menard et al. | 701/200 |
| 2003/0195850 A1 | * | 10/2003 | Stallworth | 705/43 |
| 2004/0015450 A1 | * | 1/2004 | Zingher et al. | 705/64 |
| 2004/0131230 A1 | * | 7/2004 | Paraskevakos | 382/100 |
| 2004/0158523 A1 | * | 8/2004 | Dort | 705/42 |

* cited by examiner

*Primary Examiner*—Uyen-Chau N. Le
(74) *Attorney, Agent, or Firm*—Donald R. Schoonover

(57) ABSTRACT

Theft at an automatic teller machine (ATM) is deterred by having an ATM customer enter a special number as he or she enters his or her ATM card number. This special number alerts authorities and can automatically activate cameras and/or lights. The special number activates an emergency system which can be similar to a 911 emergency system.

5 Claims, 2 Drawing Sheets

SYSTEM AND METHOD FOR PREVENTING THEFT AT AUTOMATIC TELLER MACHINES

BACKGROUND OF THE INVENTION

1. Field of the Invention

The present invention relates to the general art of telephonic communications, and to the particular field of emergency or alarm communications.

2. Discussion of the Related Art

Many people use Automatic Teller Machines (ATM) to obtain cash. These machines are nearly ubiquitous in most cities. While these machines are very helpful and convenient, they have also become a source of crime. Some people are forced to withdraw money from an ATM and then are either kidnapped or simply robbed. This has become a serious problem, especially for ATMs located in remote areas. Often, a thief will lie in wait for someone to approach the ATM and then accost the person and force them to withdraw money.

Therefore, there is a need for a means for protecting the public from theft associated with forced ATM withdrawals.

The art does contain some suggestions for such protection. However, the art of which the inventor is aware often requires the victim to dial a special telephone number or activate a special button. A thief will readily know of these emergency procedures and will prevent the victim from using them. If such emergency elements are not activated, they are virtually worthless as the authorities will not be notified of the crime.

Therefore, there is a need for a means for protecting the public from theft associated with forced ATM withdrawals and which can be activated by a potential victim without interference from the criminal.

In such cases, the theft may not be discovered until the receipts associated with the ATM are reviewed. This may not occur for many hours. A lapse of several hours, or days, may be fatal for a victim of such crimes.

Therefore, there is a need for a means for protecting the public from theft associated with forced ATM withdrawals and which can be activated by a potential victim without interference from the criminal and which can be activated in a manner such that help will be quickly dispatched.

It is well known that criminals require complete secrecy to operate. Any attention-capturing device will thus be a significant deterrent for a robbery.

Therefore, there is a need for a means for protecting the public from theft associated with forced ATM withdrawals and which will also automatically activate some means for attracting attention to the ATM.

As is also well known, many criminals are acquitted for lack of evidence. The burden of proof is very high in criminal cases. This is an especially difficult problem in the area of ATM thefts since there is little, if any, evidence of the crime.

Therefore, there is a need for a means for protecting the public from theft associated with forced ATM withdrawals and which will also automatically activate some means for recording the events occurring at the ATM.

PRINCIPAL OBJECTS OF THE INVENTION

It is a main object of the present invention to provide a means for protecting the public from theft associated with forced ATM withdrawals.

It is another object of the present invention to provide a means for protecting the public from theft associated with forced ATM withdrawals and which can be activated by a potential victim without interference from the criminal.

It is another object of the present invention to provide a means for protecting the public from theft associated with forced ATM withdrawals and which can be activated by a potential victim without interference from the criminal and which can be activated in a manner such that help will be quickly dispatched.

It is another object of the present invention to provide a means for protecting the public from theft associated with forced ATM withdrawals and which will also automatically activate some means for attracting attention to the ATM.

It is another object of the present invention to provide a means for protecting the public from theft associated with forced ATM withdrawals and which will also automatically activate some means for recording the events occurring at the ATM.

SUMMARY OF THE INVENTION

These, and other, objects are achieved by a system and method which will permit a customer of an ATM to activate an emergency system without the knowledge of the criminal. The system and method embodying the present invention is activated by the customer pushing an extra key as he or she enters his or her ATM card number. The criminal must allow the victim to enter his or her ATM card number in order to complete the transaction. Adding one or more numbers to this card number will not alert the criminal that the crime has been reported. The criminal cannot prevent or stop the victim from entering this extra emergency number as the crime cannot be completed without the victim entering his or her ATM number.

Entry of the emergency number will automatically alert authorities and, in some cases, automatically activate security surveillance cameras and/or lights that will attract attention to the ATM.

Using the system and method embodying the present invention will permit a potential crime victim to alert authorities in a manner that cannot be prevented by a criminal and will quickly bring help.

BRIEF DESCRIPTION OF THE DRAWING FIGURES

DETAILED DESCRIPTION OF THE PREFERRED EMBODIMENT

Figure 1:
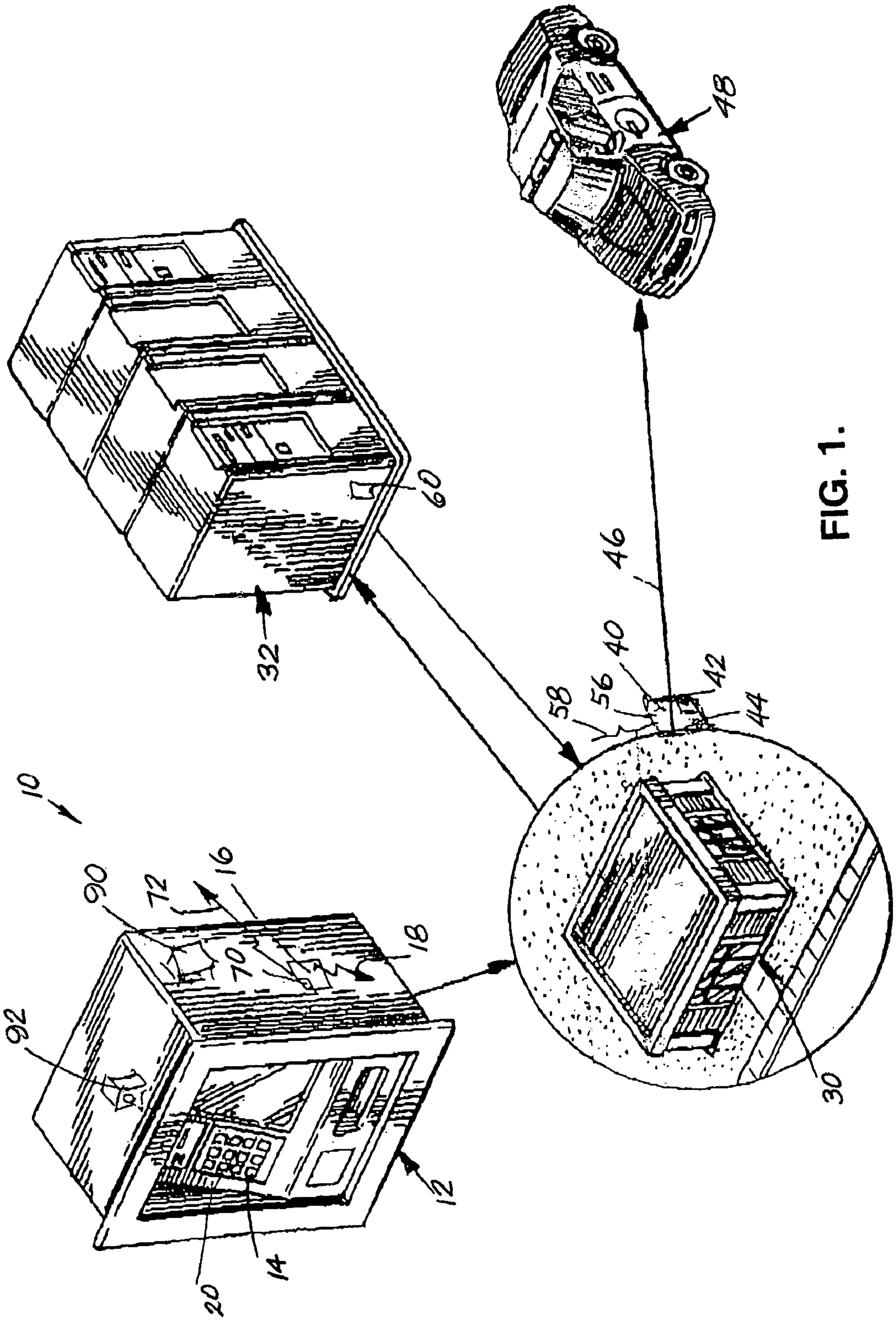
FIG. 1 is a perspective view of an emergency system associated with automatic teller machines embodying the present invention.

Other objects, features and advantages of the invention will become apparent from a consideration of the following detailed description and the accompanying drawings.

Referring to the Figures, it can be understood that the present invention is embodied in a system 10 for preventing theft at an automatic teller machine (ATM). System 10 comprises an ATM 12 which includes a plurality of input keys, such as key 14, that are used to input a user code during a process of withdrawing money from the ATM. Each of the keys generates a signal when activated. A computer 16 is connected to the input keys of the ATM and includes a program that reads signals generated by the keys of the ATM. The program in the computer 16 includes a subroutine that generates an emergency assistance code 18 when a special key 20 is pressed during the operation of the keys of the ATM. It is noted that the special key 20 can be an ordinary key of the keypad associated with the ATM which is activated to become the special key 20 by entering a special sequence of keys during entry of the ATM code. That is, for example, any key becomes a special key 20 after the ATM code is completed and thus entry of the ATM code, if any key is pressed, that extra key generates the emergency assistance code 18.

System 10 further includes a telephone central office 30 connected to the computer of the ATM via land lines or via wireless connections as is appropriate. The telephone central office 30 includes a system 32 which relays emergency assistance code 18 received from computer 16 in the ATM.

An emergency assistance provider 40 is connected to the central office 30 and includes a receiver 42 which receives the emergency assistance code 18 from the central office 30.

A system 44 is located at the emergency assistance provider 40 and generates a signal 46 to an emergency assistance provider element 48 to dispatch the emergency assistance provider 40 to the ATM.

Emergency assistance provider 40 can include a system 56 which generates a confirmation code signal 58 upon receipt of the emergency assistance code 18. Telephone central office 30 can include a system 60 which receives confirmation code signal 58 from emergency assistance provider 40 and relays the confirmation code signal 58 to the ATM.

If system 10 includes systems for confirming the generation of a request for assistance, the ATM will include a system 70 which receives confirmation code signal 58 from the telephone central office 30 and transmits a confirming code signal 72 upon receipt of the signal and either positive action by the user of the ATM or no canceling procedure from the user of the ATM, whichever is more appropriate under the circumstances. Telephone central office 30 will further include a system which receives confirming code signal 72 from the ATM and relays the confirming code signal 72 to the emergency assistance provider 40. The emergency assistance provider 40 will only dispatch help after receiving the confirming code signal 72 so false signals are not generated by an accidentally mis-entered code at the ATM.

If desired, system 10 can include lights 90 and/or surveillance cameras 92 at the ATM. These lights 90 and cameras 92 will be connected to the computer 16 in the ATM to be automatically activated upon activation of the special key 20.

Figure 2:
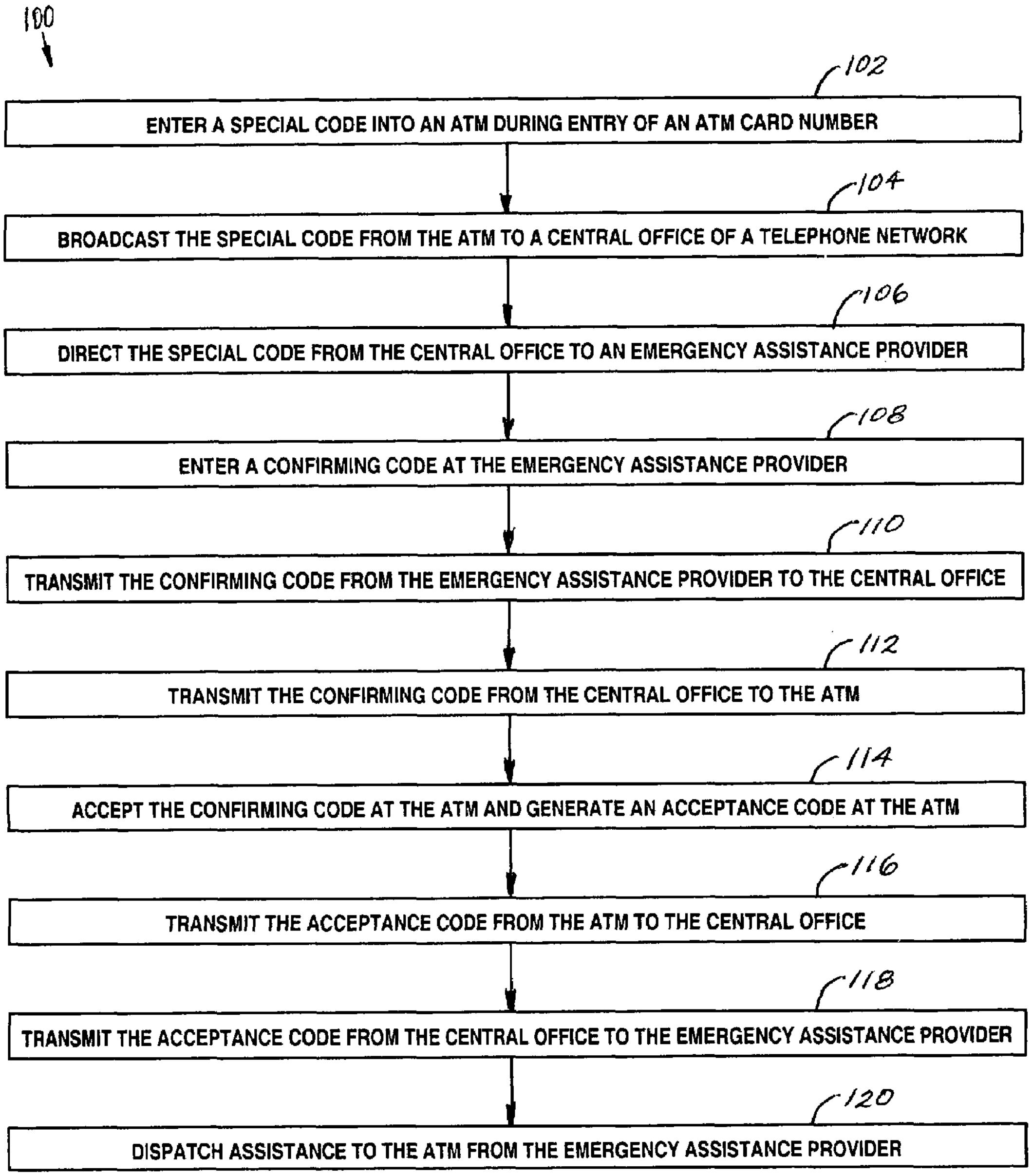
FIG. 2 shows the steps associated with a method embodying the present invention.

Referring to FIG. 2, a method 100 for preventing theft at an automatic teller machine (ATM) using system 10 comprises entering a special code into an ATM during entry of an ATM card number 102; broadcasting the special code from the ATM to a central office of a telephone network 104; directing the special code from the central office to an emergency assistance provider 106; entering a confirming code at the emergency assistance provider 108; transmitting the confirming code from the emergency assistance provider to the central office 110; transmitting the confirming code from the central office to the ATM 112; accepting the confirming code at the ATM and generating an acceptance code at the ATM 114; transmitting the acceptance code from the ATM to the central office 116; transmitting the acceptance code from the central office to the emergency assistance provider 118; and dispatching assistance to the ATM from the emergency assistance provider 120.

The method can further include activating lights and/or surveillance cameras upon the entry of the special code into the ATM.

As can be understood from the above, the procedure can be shortcut by omitting the steps associated with the confirming code and dispatching assistance immediately upon receipt of a special code signal from the ATM.

It is understood that while certain forms of the present invention have been illustrated and described herein, it is not to be limited to the specific forms or arrangements of parts described and shown.

What is needed and desired to be covered by Letters Patent is as follows:

1. A system for preventing theft at an automatic teller machine (ATM) comprising:

a) an ATM which includes a plurality of input keys that are used to input a user code during a process of withdrawing money from the ATM, each of the keys generating a signal when activated;

b) a computer connected to the input keys of said ATM, said computer including a program that reads signals generated by the keys of said ATM, the program including a subroutine that generates an emergency assistance code when a special key is pressed during the operation of the keys of said ATM;

c) a telephone central office connected to said computer, said telephone central office including a system which relays the emergency assistance code received from said computer upon receipt of the emergency assistance code from said ATM;

d) an emergency assistance provider connected to said central office and which includes a receiver which receives the emergency assistance code from said central office; and e) a system in said emergency assistance provider for generating a signal to an emergency assistance provider element in response to receipt of the emergency assistance code received from said telephone central office to dispatch the emergency assistance provider element to said ATM; and f) wherein said emergency assistance provider includes a system for generating a confirmation code signal upon receipt of an emergency assistance code from said telephone central office, said telephone central office further includes a system for receiving the confirmation code signal from said emergency assistance provider and relaying the confirmation code signal to said ATM; said ATM further includes a system for receiving the confirmation code signal from said telephone central office and transmitting a confirming code signal, and said telephone central office further includes a system for receiving the confirming code signal from said ATM and relaying the confirming code signal to said emergency assistance provider.

2. The system as described in claim 1 wherein said ATM further includes cameras which are connected to the special key.

3. The system as described in claim 1 wherein said ATM further includes lights which are connected to the special key.

4. A method of preventing theft at an automatic teller machine (ATM) comprising:

a) entering a special code into an ATM during entry of an ATM card number;

b) broadcasting the special code from the ATM to a central office of a telephone network;

c) directing the special code from the central office to an emergency assistance provider;

d) entering a confirming code at the emergency assistance provider;

e) transmitting the confirming code from the emergency assistance provider to the central office;

f) transmitting the confirming code from the central office to the ATM;

g) accepting the confirming code at the ATM and generating an acceptance code at the ATM;

h) transmitting the acceptance code from the ATM to the central office;

i) transmitting the acceptance code from the central office to the emergency assistance provider; and j) dispatching assistance to the ATM from the emergency assistance provider.

5. A method of preventing theft at an automatic teller machine (ATM) comprising:

a) entering a special code into an ATM during entry of an ATM card number;

b) broadcasting the special code from the ATM to an emergency assistance provider;

c) entering a confirming code at the emergency assistance provider;

d) transmitting the confirming code from the emergency assistance provider to the ATM;

e) accepting the confirming code at the ATM and generating an acceptance code at the ATM;

f) transmitting the acceptance code from the ATM to the emergency assistance provider; and g) dispatching assistance to the ATM from the emergency assistance provider.

* * * * *